Figure 1:
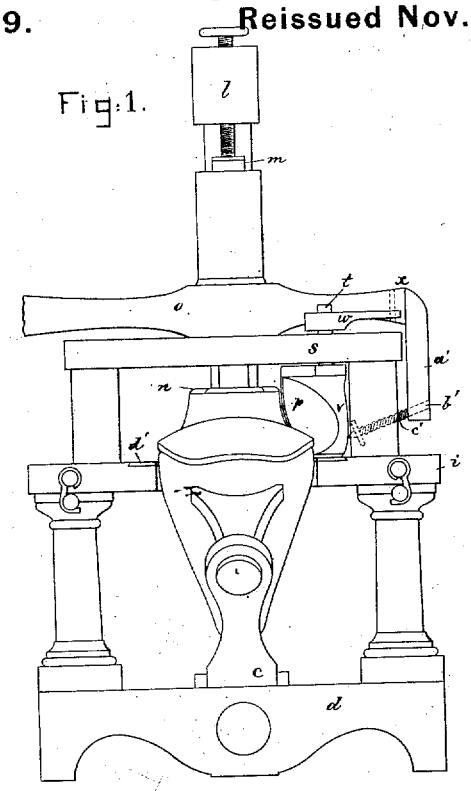

2 Sheets—Sheet 1.

E. T. GREEN.

Assignor, by mesne assignments, to J. W. BROOKS, trustee of the McKay & Bigelow Heeling Machine Association.

Machine for Cutting Boot and Shoe Heels.

No. 7,969. Reissued Nov. 27, 1877.

Witnesses.
E. B. Perkins.
W. J. Pratt.

Inventor
Elisha T. Green
by Crosby, Gregory, & May

2 Sheets—Sheet 2.

E. T. GREEN.

Assignor, by mesne assignments, to J. W. BROOKS, trustee of the McKay & Bigelow Heeling Machine Association.

Machine for Cutting Boot and Shoe Heels.

No. 7,969. Reissued Nov. 27, 1877.

Witnesses.
E. C. Perkins
W. G. Pratt.

Inventor.
Elisha T. Green
by Crosby & Gregory Attys

UNITED STATES PATENT OFFICE.

ELISHA T. GREEN, OF STONEHAM, MASSACHUSETTS, ASSIGNOR, BY MESNE ASSIGNMENTS, TO JAMES W. BROOKS, TRUSTEE OF THE McKAY & BIGELOW HEELING MACHINE ASSOCIATION.

IMPROVEMENT IN MACHINES FOR CUTTING BOOT AND SHOE HEELS.

Specification forming part of Letters Patent No. 30,376, dated October 9, 1860; extended seven years; Reissue No. 7,969, dated November 27, 1877; application filed November 16, 1877.

*To all whom it may concern:*

Be it known that I, ELISHA T. GREEN, of Stoneham, in the county of Middlesex and State of Massachusetts, have invented certain new and useful improvements in such machines as form or shape the heels of boots and shoes by cutting or trimming them when they are made fast thereto; and I do hereby declare that the following is a clear, full, and exact description of my said invention, reference being had to the accompanying drawings, which form part of this specification.

I have embodied my invention in a machine which contains the following instrumentalities, viz: first, a holding mechanism composed of two parts, one a support at the inside of the shoe, and the other a plate placed at the heel-lift end of the heel, the heel to be trimmed being held between such support and plate, such two parts being also movable, one with relation to the other, to apply and remove the shoe; second, a knife and its stock so held by or jointed to the mover of the knife-stock that the knife is free to move toward and from the center of the heel under the action of the guiding-surfaces at the two ends of the heel, that it is free to have a torsional or oscillating movement to adapt itself to the varying slope of the heel caused by differences in the relative size and shape of such guiding-surfaces, to thereby trim the heel to the desired shape, while at the same time the knife-stock is so operated upon by the action of a cam-groove or cam that the edge of the knife, controlled as to its position by the guiding-surfaces at the two ends of the heel, is controlled as to the angle of its presentation to the heel to be trimmed, during the operation of the machine, so that such edge shall cut at substantially the same angle to the surface of the heel at all parts of its contour; third, a mechanism for applying power to the apparatus to cause the heel to be cut all about by the knife, beginning its cut at one corner of the heel-breast and ending at the other, while the shape of the heel and the angle of the cutting-edge are governed by other instrumentalities.

One important difference between the machine herein described and those which preceded it is, that the knife and its stock are guided at three independent points—one, a surface at the heel-lift end of the heel; another, a surface at the heel-seat end of the heel; and another, a cam-groove or cam of a shape different from that of the heel—each of such guiding-points being capable of operating upon the knife without interfering with the operation of the others.

In this invention the knife makes a continuous cut around the curved boundary of the heel, and does not cut the material into shavings by means of a rotating cutter.

Figure 2:
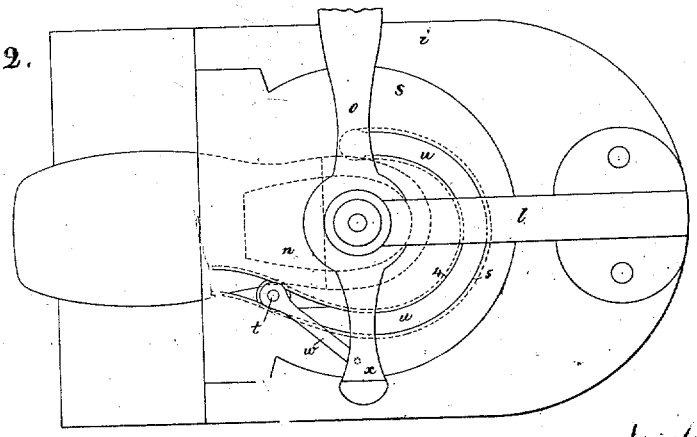
Figure 5:
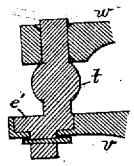

Figure 1 represents, in front elevation, a machine embodying my invention; Fig. 2, a plan, and Fig. 3 a side elevation, thereof. Fig. 4 is a view in perspective, showing the knife, its stock, and the heel; and Fig. 5 is a detail, to be hereinafter referred to.

Figure 3:
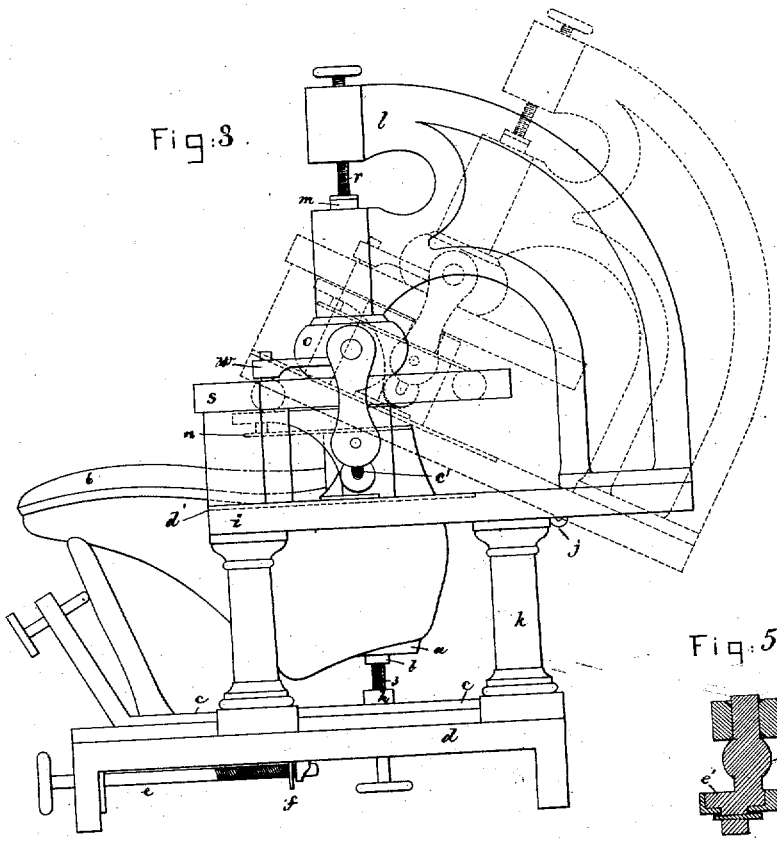
Figure 4:
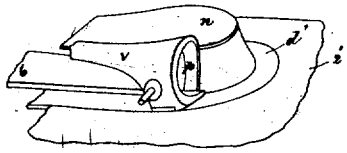

In Fig. 3 the dotted lines illustrate one part of the holding mechanism moved away from the other part to facilitate changing the shoe or boot.

The support for the inner portion of the heel and shoe is shown as a last, *a*, mounted on the end *b* of a pin, 3, which enters a hole made in the last. The toe of the shoe is supported on an ordinary toe-rest.

The support for the interior of the shoe is fixed to a slide, *c*, guided in suitable ways in the slide *d*, and is made adjustable in the direction of the length of the last by means of the screw *e*, connected with the bed, and the nut *f*, fixed to the slide.

The portion of the pin which enters the last has a collar or projection, *b*, which serves as a rest for the last, and below such projection the pin 3 is formed as a screw, which works in the nut *h*, attached to the slide *c*, and permits the adjustment of the heel-seat of the shoe to the proper height.

The purpose of the longitudinal and vertical adjustment will be referred to hereinafter.

The plate *i*, to which is connected that portion of the holding mechanism which contains the means for holding the heel-seat end of the heel, is hinged at *j* to supports *k*, rising from the bed, and can, with all the parts connected therewith, be swung on its hinges, so as to allow the shoe or boot to be put in position to trim the heel, or to be removed after the heel has been trimmed.

The neck *l*, as shown in the drawings, guides the slide *m*, that carries the part *n*, which acts as one of the parts of the holding mechanism, and also serves as the guiding-surface at the heel-lift end of the heel. The lever *o*, which works the knife *p*, rotates about this slide.

The slide *m* is raised and lowered as required by the connected screw *r*, it working in a nut in the neck. The plate *s* is held sufficiently above plate *i* to afford room between such plates for both the plate *n* and the highest heel to be shaped in the machine. This plate *s* is provided with a suitably-shaped cam-groove, *u*, which differs in shape from the shape of the heel. This cam-groove or cam acts upon the connection or joint *t*, which joins the stock *v* of the knife with the link *w*, jointed to the end *x* of the lever *o*, such end being also shown as extended beyond and below plate *s*, as at *a'*, to support the rod *b'* and its spring *c'*, which act upon the knife-stock *v*, and force the edge of the knife *p* against the guiding-surfaces at each end of the heel, such knife moving toward and from the axis of the heel, according to the size of the guiding-surfaces.

The end of rod *b'* is adapted to fit any one of several depressions in the knife-stock at different positions with reference to the length of the cutting-edge of the knife, so that the pressure of spring *c'* will be exerted to hold the knife equally against both guiding-surfaces, or more against one than against the other, as may be desired.

The knife is prevented from moving vertically or in the direction of the axis of the heel by fitting loosely between the plate *s* and the slide *d'*, of which different sizes are made to fit interchangeably into grooves in the plate *i*, such slides *d'* conforming nearly in shape and size with the heel end of the sole 6 of the shoe to be operated upon.

That the knife may conform to the various sizes of heels, or to heels having various sizes at the tread and seat, it is requisite to give the knife-carrier freedom to adjust itself to the guiding-surfaces which determine the shape and slope of the heel, such surfaces, as herein shown, being the plate *n* and the heel-seat portion of the sole. This may be variously accomplished, though it is believed that the mechanism herein shown and described is well adapted for the purpose. The connection or joint *t*, joining the knife-stock *v* and the link *w*, is spherical (see sectional details, Fig. 5) where it fits the cam-groove made in the plate *i*, such construction permitting free torsional movement of the knife-stock, though measurably controlling its other movements. The lower end of this joint *t*, where it is joined with the knife-stock, is provided with a knife-stock-adjusting device, shown as an eccentric, *e'*, so that by turning the eccentric the end of the knife-stock most remote from the cutting-edge of the knife may be moved, as desired, toward or from the part *n*.

The operation of the machine is as follows: One part of the holding mechanism being moved away from the other, the last, with a shoe upon it, is placed on the last-pin, with the toe lying on the toe-rest. The two parts of the holding mechanism are then brought together in operative position, it being assumed that the slide *d'* is suitable to the size of the shoe to be operated upon, and that the plate *n*, which is made to shift, is of the form and size desired for the heel-tread. By operating the screw *e*, the rear of the seat of the heel is located as much back of the rear of the plate *n*, which aids in holding the heel in position, as is required for the shape desired, and then the shoe is adjusted vertically, by means of the pin 3, until the joint between the upper and sole comes just above the slide *d'*. If the last has not before been cramped upon its pin, by setting up the toe-rest this may be done, and derangement of the position of the shoe be corrected by proper adjustments.

By means of screw *r*, the plate *n* is made to hold the heel-lift or tread portion of the heel, and confine the heel properly for the action of the knife.

When the holding parts for the heel are put in position to confine it, the knife is placed with its edge in front of, and toward, the flat surface of the heel ready to be operated; then, by about half a revolution of the lever *o*, the knife will trim the heel, following the outer curved surfaces of the guides at the top and bottom of the heel.

In the manufacture of boots and shoes, it is common to stamp out the sole, or otherwise to give it very nearly the form and size required for the finished article. I am thus enabled to make use of the sole itself as a guiding-surface for the knife at the heel-seat end or base of the heel.

To protect the sole, the knife-carrier, or a part of the knife itself, bears upon it both in front and at the rear of the cutting-edge. When the upper of the shoe is not thrust above the slide it is perfectly protected from the action of the knife, which should be so adjusted as to cut the upper portion of the sole or the heel-seat, so as to make "fair" work, and to avoid a crease between the heel and its seat.

Harmony of outline of the heel and heel-seat can be best obtained by the use of the seat as a guiding-surface; for if the seat is irregular, the heel should also be made so, thereby making the defect less palpable.

I am aware that it has been attempted to guide a heel-cutting knife upon that part of the upper which is located above the heel, or upon a clamp surrounding this part; but the curves of this part and of the heel are not necessarily similar.

The stiffening used in the heel part of the counter and the seam at the heel vary in every shoe.

I claim—

1. In a heel-trimming machine, the combination, with the knife or cutter, of a cam-groove or cam adapted, substantially as herein described, to control the angle of presentation of the knife to the heel, substantially as and for the purpose set forth.

2. In a machine for trimming the heels of boots and shoes, the combination of the knife and its stock with a cam-groove or cam to control the angle of presentation of the knife to the heel during the operation of trimming, acting together with guiding-surfaces at the top and bottom of the heel, the combination being and operating substantially as set forth.

3. In a machine for trimming the heels of boots and shoes, a knife-stock joined with its moving devices to permit the free torsional movement, as described, in combination with a guiding-surface at the top of the heel, the knife being also guided at the seat of the heel, substantially as described.

4. In a machine for trimming the heels of boots and shoes, a knife-stock or knife-carrier provided with a joint permitting free torsional movement, a guiding-surface at or near the cutting-edge of the proper shape for the top of the heel, in combination with a cam or cam-groove to control the angular presentation of the cutting-edge to the heel during the operation of trimming, the knife being also guided at the heel-seat end of the heel, substantially as set forth.

5. In a machine for trimming the heels of boots and shoes, the combination, with the knife-stock and a cam-groove or cam to automatically vary the angle of presentation of the edge of the cutter to the heel, of an adjusting device to adjust the position of the knife-stock with reference to the heel and the cam, to operate substantially as shown and described.

6. A heel-trimming machine embodying the following instrumentalities, viz: a holding or clamping mechanism made in two parts, to be separated for the introduction and removal of a heel, a knife and knife-stock jointed to permit free torsional movement, a guiding-surface for the knife at the top-lift end of the heel, (the knife being also guided at the heel-seat end of the heel,) a suitably-shaped cam-groove or cam to determine the angle of presentation of the cutting-edge, and a mechanism to apply power to the apparatus, to cause the heel to be cut all about by the knife, substantially as described.

7. The combination of a heel-cutting mechanism, acting substantially as specified, with a mechanism for relatively adjusting in the direction of the length of the shoe the tread and seat formers, by which the rake or pitch of the rear of the heel may be varied without substitution of other formers.

8. In a heel-trimming machine, a support adapted to hold the shoe in such position that the edge of the sole at the heel comes in contact with the knife-guard, in combination with a knife adapted to be guided by the heel-seat portion of the sole, substantially as described.

In witness whereof I have hereunto set my hand.

ELISHA T. GREEN.

Witnesses:
G. W. GREGORY,
W. J. PRATT.